United States Patent
Marvit et al.

(10) Patent No.: US 9,081,852 B2
(45) Date of Patent: Jul. 14, 2015

(54) RECOMMENDING TERMS TO SPECIFY ONTOLOGY SPACE

(75) Inventors: David L. Marvit, San Francisco, CA (US); Jawahar Jain, Los Altos, CA (US); Stergios Stergiou, Sunnyvale, CA (US); Alex Gilman, Fremont, CA (US); B. Thomas Adler, Santa Cruz, CA (US); John J. Sidorowich, Santa Cruz, CA (US); Albert Reinhardt, Albany, CA (US); Yannis Labrou, Washington, DC (US)

(73) Assignee: Fujitsu Limited, Kawasaki-shi (JP)

( * ) Notice: Subject to any disclaimer, the term of this patent is extended or adjusted under 35 U.S.C. 154(b) by 1180 days.

(21) Appl. No.: 12/243,050

(22) Filed: Oct. 1, 2008

(65) Prior Publication Data
US 2009/0094020 A1    Apr. 9, 2009

Related U.S. Application Data (60) Provisional application No. 60/977,934, filed on Oct. 5, 2007.

(51) Int. Cl.
*G06F 17/27* (2006.01)
*G06F 17/30* (2006.01)

(52) U.S. Cl.
CPC .... *G06F 17/30672* (2013.01); *G06F 17/30616* (2013.01); *G06F 17/30646* (2013.01); *G06F 17/30864* (2013.01)

(58) Field of Classification Search
CPC ............. G06F 17/30716; G06F 17/30722; G06F 17/30389; G06F 17/30707; G06F 17/30713; G06F 17/2785; G06F 17/30598; G06F 17/30; G06F 3/48

USPC ............. 704/9, 275, 241; 707/742, 722, 707/E17.099, 754, 739, 737, 713, 706; 715/764, 234, 206, 205
See application file for complete search history.

(56) References Cited

U.S. PATENT DOCUMENTS 5,907,836 A * 5/1999 Sumita et al. .......... 707/754
6,023,676 A * 2/2000 Erell ...................... 704/241

(Continued)

FOREIGN PATENT DOCUMENTS

| EP | 1 320 042 A2 | 6/2003 | ............. G06F 17/30 |
| EP | 1 494 144 A2 | 1/2005 | |

(Continued)

OTHER PUBLICATIONS

Tomassen et al. "Document Space Adapted Ontology: Application in Query Enrichment" 2006.*

(Continued)

*Primary Examiner* — Michael Colucci
(74) *Attorney, Agent, or Firm* — Baker Botts L.L.P.

(57) ABSTRACT

In one embodiment, a set of target search terms for a search is received. Candidate terms are selected, where a candidate term is selected to reduce an ontology space of the search. The candidate terms are sent to a computer to recommend the candidate terms as search terms. In another embodiment, a document stored in one or more tangible media is accessed. A set of target tags for the document is received. Terms are selected, where a term is selected to reduce an ontology space of the document. The terms are sent to a computer to recommend the terms as tags.

28 Claims, 5 Drawing Sheets

(56) References Cited

U.S. PATENT DOCUMENTS

| | | | |
|---|---|---|---|
| 6,038,560 A * | 3/2000 | Wical | 1/1 |
| 6,175,829 B1 | 1/2001 | Li et al. | |
| 6,397,205 B1 * | 5/2002 | Juola | 1/1 |
| 6,587,848 B1 * | 7/2003 | Aggarwal et al. | 1/1 |
| 6,675,159 B1 * | 1/2004 | Lin et al. | 1/1 |
| 6,687,696 B2 * | 2/2004 | Hofmann et al. | 1/1 |
| 6,766,316 B2 * | 7/2004 | Caudill et al. | 1/1 |
| 6,772,170 B2 * | 8/2004 | Pennock et al. | 1/1 |
| 6,832,350 B1 * | 12/2004 | Bates et al. | 715/206 |
| 6,990,628 B1 * | 1/2006 | Palmer et al. | 715/234 |
| 7,113,954 B2 | 9/2006 | Vogel | 707/101 |
| 7,139,695 B2 * | 11/2006 | Castellanos | 704/4 |
| 7,152,063 B2 * | 12/2006 | Hoashi et al. | 1/1 |
| 7,266,548 B2 * | 9/2007 | Weare | 1/1 |
| 7,299,187 B2 * | 11/2007 | Tahara et al. | 704/275 |
| 7,536,637 B1 * | 5/2009 | Nauerz et al. | 715/230 |
| 7,634,482 B2 * | 12/2009 | Mukherjee et al. | 1/1 |
| 7,636,714 B1 * | 12/2009 | Lamping et al. | 1/1 |
| 7,647,349 B2 * | 1/2010 | Hubert et al. | 707/999.107 |
| 7,685,198 B2 * | 3/2010 | Xu et al. | 707/748 |
| 7,685,200 B2 * | 3/2010 | Gunawardena et al. | 707/748 |
| 7,734,627 B1 * | 6/2010 | Tong | 707/737 |
| 7,792,858 B2 * | 9/2010 | Tang et al. | 707/780 |
| 7,844,566 B2 | 11/2010 | Wnek | 706/55 |
| 7,912,701 B1 * | 3/2011 | Gray et al. | 704/9 |
| 7,971,150 B2 * | 6/2011 | Raskutti et al. | 715/764 |
| 7,974,976 B2 * | 7/2011 | Yahia et al. | 707/736 |
| 8,014,997 B2 * | 9/2011 | Huang et al. | 704/7 |
| 8,019,707 B2 * | 9/2011 | Shani et al. | 706/45 |
| 8,196,039 B2 * | 6/2012 | Curtis et al. | 715/259 |
| 8,312,021 B2 * | 11/2012 | Matveeva et al. | 707/739 |
| 8,346,757 B1 * | 1/2013 | Lamping et al. | 707/713 |
| 8,688,673 B2 * | 4/2014 | Sarkar | 707/706 |
| 2002/0022956 A1 * | 2/2002 | Ukrainczyk et al. | 704/9 |
| 2002/0024532 A1 * | 2/2002 | Fables et al. | 345/700 |
| 2002/0091661 A1 | 7/2002 | Anick et al. | |
| 2003/0135725 A1 | 7/2003 | Schirmer et al. | |
| 2003/0182168 A1 * | 9/2003 | Lyons | 705/8 |
| 2004/0083424 A1 * | 4/2004 | Kawai et al. | 715/501.1 |
| 2004/0158569 A1 * | 8/2004 | Evans et al. | 707/100 |
| 2004/0210600 A1 | 10/2004 | Chand | 707/103 R |
| 2005/0065773 A1 * | 3/2005 | Huang et al. | 704/7 |
| 2005/0198068 A1 * | 9/2005 | Mukherjee et al. | 707/104.1 |
| 2005/0256866 A1 * | 11/2005 | Lu et al. | 707/5 |
| 2006/0053151 A1 * | 3/2006 | Gardner et al. | 707/102 |
| 2006/0053382 A1 * | 3/2006 | Gardner et al. | 715/764 |
| 2006/0074836 A1 * | 4/2006 | Gardner et al. | 706/60 |
| 2006/0080315 A1 * | 4/2006 | Mitchell | 707/6 |
| 2006/0143175 A1 * | 6/2006 | Ukrainczyk et al. | 707/6 |
| 2006/0155751 A1 * | 7/2006 | Geshwind et al. | 707/102 |
| 2006/0212294 A1 | 9/2006 | Gorin et al. | 704/245 |
| 2006/0224554 A1 * | 10/2006 | Bailey et al. | 707/1 |
| 2006/0259475 A1 * | 11/2006 | Dehlinger | 707/3 |
| 2007/0011147 A1 * | 1/2007 | Falkenberg | 707/3 |
| 2007/0174247 A1 * | 7/2007 | Xu et al. | 707/3 |
| 2007/0203996 A1 * | 8/2007 | Davitz et al. | 709/206 |
| 2008/0005064 A1 * | 1/2008 | Sarukkai | 707/3 |
| 2008/0082520 A1 | 4/2008 | Bohn et al. | 707/5 |
| 2008/0097975 A1 * | 4/2008 | Guay et al. | 707/4 |
| 2008/0201651 A1 * | 8/2008 | Hong et al. | 715/764 |
| 2008/0215583 A1 * | 9/2008 | Gunawardena et al. | 707/7 |
| 2008/0235216 A1 * | 9/2008 | Ruttenberg | 707/5 |
| 2008/0281790 A1 * | 11/2008 | Prosser et al. | 707/3 |
| 2010/0023505 A1 * | 1/2010 | Tateishi et al. | 707/5 |

FOREIGN PATENT DOCUMENTS

| | | | | |
|---|---|---|---|---|
| WO | WO 2005/091825 A2 | 10/2005 | | |
| WO | WO 2006/104683 A2 | 10/2006 | | |
| WO | WO 2007/019311 A2 | 2/2007 | | G06F 7/00 |

OTHER PUBLICATIONS

Hassan-Montero et al. "Improving Tag-Clouds as Visual Information Retrieval Interfaces" Oct. 2006.*
Dey et al. "Ontology Aided Query Expansion for Retrieving Relevant Texts" 2005.*
Wu et al. "Exploring Social Annotations for the Semantic Web" May 2006.*
Specia et al. "Integrating Folksonomies with the Semantic Web" Jun. 2007.*
Ceccaroni et al. "A Graphical Environment for Ontology Development" 2003.*
Sood et al. "TagAssist: Automatic Tag Suggestion for Blog Posts" Mar. 2007.*
Marlow et al. "Position Paper, Tagging, Taxonomy, Flickr, Article, ToRead" 2006.*
Herzog et al. "Combining Social and Semantic Metadata for Search in a Document Repository" Jun. 2007.*
Santos-Neto et al. "Tracking Usage in Collaborative Tagging Communities" 2007.*
Veres. "The Language of Folksonomies: What Tags Reveal About User Classification" 2006.*
Xu et al. "Towards the Semantic Web: Collaborative Tag Suggestions" 2006.*
Halpin et al. "The Complex Dynamics of Collaborative Tagging" May 2007.*
Communication from European Patent Office, European Search Report dated Dec. 27, 2010 for European Patent Application No. 09152741.6-1527/2090992.
Communication from the European Patent Office, European Search Report dated Jan. 19, 2009 for European Patent Application No. 08165841.1-1527, 6 pages, Jan. 19, 2009.
U.S. Appl. No. 12/368,689, by inventors Yann is Labrou et al., entitled "Determining Words Related to a Given Set of Words," filed Feb. 10, 2009, 70 pages including drawings, Feb. 10, 2009.
The State Intellectual Property Office of China, First Notification of Office Action, Patent Application No. 200810166181.X, Chinese Office Action and English Translation, 8 pages, Sep. 2, 2010.
The State Intellectual Property Office of China, First Notification of Office Action, Patent Application No. 200810166182.4, Chinese Office Action and English Translation, 15 pages, Jul. 14, 2010.
Communication from Chinese Patent Office, Text of the First Office Action for Chinese Patent Application No. 200910007161.2, 6 pages, Transmitted Feb. 21, 2011.
U.S. Appl. No. 12/242,984, by inventors David L. Marvit et al., entitled "Selecting Tags for a Document by Analyzing Paragraphs of the Document," 48 pages including drawings, Oct. 1, 2008.
Brooks et al.; "Improved Annotation of the Blogospere via Autotagging and Hierarchical Clustering"; ACM WWW 2006; pp. 625-631, 2006.
United States Office Action; U.S. Appl. No. 12/242,984; pp. 28 , Jul. 20, 2011.
United States Office Action; U.S. Appl. No. 12/242,984; pp. 20, Jan. 5, 2012.
Chinese Office Action with English Translation; Application No. 200810166181.X; pp. 6, Mar. 16, 2012.
Chinese Office Action, Application No. 200810166182.4, with English Translation, 14 pages, Sep. 20, 2011.
Chinese Office Action, Application No. 200810166182.4, with English Translation, 9 pages, Nov. 15, 2014.
Chinese Office Action, Application No. 200810166182.4, with English Translation, 17 pages, May 5, 2014.
Japanese Office Action with English Translation; Application No. 2008-25629; pp. 13, Mar. 5, 2013.
European Office Action, Application No. 08 165 841.1-1507; pp. 7, Apr. 2, 2013.

* cited by examiner

|  | $w_1$ DOG | $w_2$ FOREST | $w_3$ TREE | $w_4$ GRAPHICS | $w_5$ COMPUTER |
|---|---|---|---|---|---|
|  |  |  |  |  |  |
| $w_0$ BINARY | 0.003 | 0.005 | 0.037 | 0.021 | 0.066 |
| $w_1$ DOG |  | 0.024 | 0.033 | 0.017 | 0.049 |
| $w_2$ FOREST |  |  | 0.092 | 0.004 | 0.052 |
| $w_3$ TREE |  |  |  | 0.042 | 0.056 |
| $w_4$ GRAPHICS |  |  |  |  | 0.222 |

|  | $w_0$ BINARY | $w_1$ DOG | $w_2$ FOREST | $w_3$ TREE | $w_4$ GRAPHICS | $w_5$ COMPUTER |
|---|---|---|---|---|---|---|
| $w_0$ BINARY | 1 | 0.004 | 0.005 | 0.016 | 0.020 | 0.037 |
| $w_1$ DOG | 0.018 | 1 | 0.022 | 0.026 | 0.016 | 0.047 |
| $w_2$ FOREST | 0.013 | 0.013 | 1 | 0.055 | 0.008 | 0.026 |
| $w_3$ TREE | 0.071 | 0.029 | 0.102 | 1 | 0.034 | 0.060 |
| $w_4$ GRAPHICS | 0.071 | 0.013 | 0.012 | 0.026 | 1 | 0.255 |
| $w_5$ COMPUTER | 0.360 | 0.112 | 0.103 | 0.128 | 0.716 | 1 |

|  | WORD 1 | WORD 2 | WORD 3 | [...] | WORD 50,000 |
|---|---|---|---|---|---|
| WORD 1 | ----- | 0.005 | 0.037 | [...] | 0.066 |
| WORD 2 |  | ----- | 0.033 | [...] | 0.049 |
| WORD 3 |  |  | ----- | [...] | 0.052 |
| [...] |  |  |  | ----- | [...] |
| WORD 50,000 |  |  |  |  | ----- |
| AVERAGE | AA1 | AA2 | AA3 | [...] | AA50,000 |

RECOMMENDING TERMS TO SPECIFY ONTOLOGY SPACE

RELATED APPLICATION

This application claims benefit under 35 U.S.C. §119(e) of U.S. Provisional Application Ser. No. 60/977,934, titled "Techniques for Improved Tagging," filed Oct. 5, 2007, by David Marvit et al.

TECHNICAL FIELD

The present invention relates generally to lexigraphical analysis and, more particularly, to recommending terms to specify ontology space.

BACKGROUND

A corpus of data may hold a large amount of information, yet finding relevant information may be difficult. Documents may be tagged to facilitate the search for relevant information. In certain situations, however, known techniques for document tagging are not effective in locating information. Similarly, known techniques for searching are not effective in locating relevant information.

DETAILED DESCRIPTION

Figure 1:
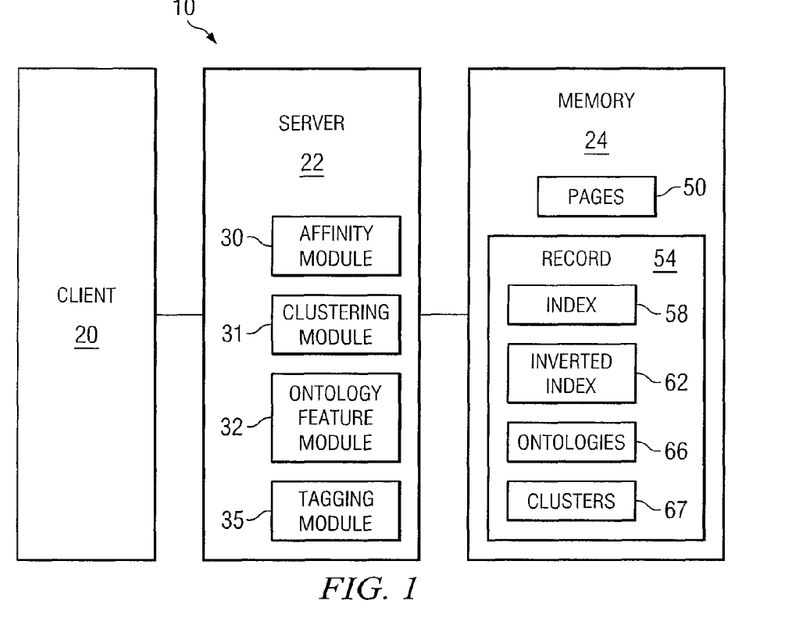
FIG. 1 illustrates one embodiment of a system that selects tags for documents.

FIG. 1 illustrates one embodiment of a system 10 that selects tags for documents. A tag may be one or more words assigned to a document, for example, as metadata. The tags may be used to facilitate the process of searching electronic documents. In particular embodiments, a document may be tagged by tags that serve to reduce the ontology space in which the document resides. These tags may be used to more readily retrieve the document. In particular embodiments, given one tag of the document, other tags that reduce the ontology space in which the document resides may be recommended.

In particular embodiments, system 10 assigns tags in response to target tags selected by, for example, a user. In the embodiments, system 10 recommends tags for a document. The recommended tags may have a higher affinity with a target tag and a lower affinity with the other recommended tags to reduce an ontology space of the document. System 10 may receive a selection of the recommended tags, and may recommend more tags in response to the selection. Once final tags have been selected, system 10 may assign the final tags to the document. The embodiment may be used to assign tags to documents that do not include text, as well as to documents that include text.

In certain embodiments, directional affinity may be calculated on a specific inverted index II for a given subset of words and a dictionary D, where index II includes, for example, entries $I(w_i)$ and $I(w_j)$ for words $w_i$ and $w_j$. In general, an inverted index is an index data structure that stores mappings from a term to its locations, that is, the co-occurrence contexts in which a term appears. For each pair of words $w_i$ and $w_j$ in D, $DA(i,j)$ may be defined as the values in the conjunction of entries $I(w_i)$, $I(w_j)$ in II divided by the number of values in $I(w_i)$. In general, $DA(i,j)$ is not necessarily equal to $DA(j,i)$. The results may be stored in any suitable manner, for example, row-wise, where the $D(j,i)$ are stored, then the $D(2,j)$ are stored, and so on. For each row i, $|I(w_i)|$ may be stored, followed by the cardinalities of the conjunctions with the $w_j$.

In certain embodiments, directional affinity may be calculated in three phases. In the embodiments, each dictionary term is assigned a unique integer identifier. The entries of an inverted index correspond to the integer identifiers. In Phase 0, the II entries corresponding to D are read. For parameters (s,o), only the element identifiers that are of the form ks+o are kept. The value ks+o defines a subset of the II entries to be examined. In this manner, directional affinities can be computed in parallel. As an example, the result from parameters s,o (1,0) is equivalent to the one obtained from the merging of the computations with parameters (3,0), (3,1), (3,2). This step allows calculation of DA tables for very large inverted indices.

In Phase 1, the conjunctions are calculated row-wise only for $DA(i,j)$. In Phase 2, the calculated upper-triangular UT DA array is read. From that, the lower-triangular part is obtained as the transpose of UT. In certain embodiments, multiple DA arrays of the same dimension may be merged into a single array. A DA array on a large II can be calculated as the $\text{sum}_{i=0 \ldots (s-1)}$ DA with parameters (s,i). Additional information may be stored with the calculated conjunctions so that directional affinities can be computed. In certain cases, the cardinalities of the II entries may be stored.

In certain embodiments, the DA may be stored row-wise, so the calculation of the AA entries may proceed in parallel with the calculation of the DA entries. In particular, AA may be generated by summing up the rows of the DA as they are read from the disk and, at the end, normalized by the number of the dictionary entries.

In the illustrated embodiment, system 10 includes a client 20, a server 22, and a memory 24. Client 20 allows a user to communicate with server 22 to generate ontologies of a language. Client 20 may send user input to server 22, and may provide (for example, display or print) server output to user. Server system 24 manages applications for generating ontologies of a language. Memory 24 stores data used by server system 24.

In the illustrated embodiment, memory 24 stores pages 50 and a record 54. A page 50 (or document or co-occurrence context) may refer to a collection of words. Examples of a page 50 include one or more pages of a document, one or more documents, one or more books, one or more web pages, correspondence (for example, email or instant messages), and/or other collections of words. A page 50 may be identified by a page identifier. A page 50 may be electronically stored in one or more tangible computer-readable media. A page 50 may be associated with any suitable content, for example, text (such as characters, words, and/or numbers), images (such as graphics, photographs, or videos), audio (such as recordings or computer-generated sounds), and/or software programs. In certain embodiments, a set of pages 50 may belong to a corpus. A corpus may be associated with a particular subject matter, community, organization, or other entity.

Record 54 describes pages 50. In the embodiment, record 54 includes an index 58, an inverted index 62, ontologies 66, and clusters 67. Index 58 includes index lists, where an index list for a page 50 indicates the words of the page 50. Inverted index 62 includes inverted index lists, where an inverted index list for a word (or set of words) indicates the pages 50 that include the word (or set of words). In one example, list $W_i$ includes page identifiers of pages 50 that include word $w_i$. List $W_i$ & $W_j$ includes page identifiers of conjunction pages 50 that include both words $w_i$ and $w_j$. List $W_i+W_j$ includes page identifiers of disjunction pages 50 that include either word $w_i$ or $w_j$. $P(W_i)$ is the number of pages 50 of $W_i$, that is, the number of pages 50 that include word $w_i$.

In one embodiment, a list (such as an index list or an inverted index list) may be stored as a binary decision diagram (BDD). In one example, a binary decision diagram $BDD(W_i)$ for set $W_i$ represents the pages 50 that have word $w_i$. The satisfying assignment count $Satisf(BDD(W_i))$ of a $BDD(W_i)$ yields the number $P(W_i)$ of pages 50 that have word $w_i$:

$P(W_i)$=Satisf(BDD($W_i$))

Accordingly, $P(W_i \& W_j)$=Satisf(BDD($W_i$) AND BDD($W_j$))

$P(W_i+W_j)$=Satisf(BDD($W_i$) OR BDD($W_j$))

Ontologies 66 represent the words of a language and the relationships among the words. In one embodiment, an ontology 66 represents the affinities between words. In the illustrated example, ontologies 66 include an affinity matrix and an affinity graph. Examples of affinity matrices are described with the reference to FIGS. 3 through 5. An example of an affinity graph is described with reference to FIG. 6. Clusters 67 record clusters of words that are related to each other. Clusters are described in more detail with reference to FIG. 7.

In the illustrated embodiment, server 22 includes an affinity module 30, a clustering module 31, an ontology feature module 32, and a tagging module 35. Affinity module 30 may calculate affinities for word pairs, record the affinities in an affinity matrix, and/or report the affinity matrix. Affinity module 30 may also generate an affinity graph. Affinity module 30 is described in more detail with reference to FIG. 2.

In particular embodiments, clustering module 31 may discover patterns in data sets by identifying clusters of related elements in the data sets. In particular embodiments, clustering module 31 may identify clusters of a set of words (for example, a language or a set of pages 50). In general, words of a cluster are highly related to each other, but not to words outside of the cluster. A cluster of words may designate a theme (or topic) of the set of words. In particular embodiments, clustering module 31 identifies clusters of related words according to the affinities among the words. In the embodiments, words of a cluster are highly affine to each other, but not to words outside of the cluster. Clustering module 31 is described in more detail with reference to FIG. 7.

In particular embodiments, ontology feature module 32 may determine one or more ontology features of a set of one or more words (for example, a particular word or document that include words), and may then apply the ontology features in any of a variety of situations. An ontology feature is a feature of a word set that may place the word set in ontology space of a language. Examples of ontology features include depth and specificity. In particular embodiments, depth may indicate the textual sophistication of a word set. A deeper word set may be more technical and specialized, while a shallower word set may be more common. In particular embodiments, the specificity of a word set is related to the number of themes of the word set. A more specific word set may have fewer themes, while a less specific word set may have more themes.

Ontology feature module 32 may apply the ontology features in any suitable situation. Examples of suitable situations include searching, sorting, or selecting documents according to an ontology feature; reporting the ontology features of a document; and determining the ontology features of documents of one or more users. Ontology feature module 32 is described in more detail with reference to FIG. 8.

In particular embodiments, tagging module 35 may select tags to tag documents. Tags may be selected in any suitable manners. In particular embodiments, tagging module 35 models topics as statistical distributions of related words of the topics. Tagging module 35 uses the statistical distributions to identify topics for which selected words of a document have the highest probability of appearance and selects tags for the document in accordance with the identified topics. In other embodiments, tagging module 35 identifies candidate tags of the paragraphs of a document. Tagging module 35 determines the relatedness of the candidate tags with other candidate tags of the document and selects tags for the document in accordance with the determination. In yet other embodiments, tagging module 35 recommends tags for a document. The tags may be recommended based on affinity (for example, directional and/or differential affinity) with target tags input or selected by a user or by a computer. Once final tags have been selected, tagger 314 may assign the selected tags to the document. Tagging module 35 is described in more detail with reference to FIG. 9.

A component of system 10 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to system 10 without departing from the scope of the invention. The components of system 10 may be integrated or separated. Moreover, the operations of system 10 may be performed by more, fewer, or other components. For example, the operations of generators 42 and 46 may be performed by one component, or the operations of affinity calculator 34 may be performed by more than one component. Additionally, operations of system 10 may be performed using any suitable logic comprising software, hardware, and/or other logic. As used in this document, "each" refers to each member of a set or each member of a subset of a set.

Modifications, additions, or omissions may be made to the examples of the matrices without departing from the scope of the invention. A matrix may include more, fewer, or other values. Additionally, the values of the matrix may be arranged in any suitable order.

Figure 2:
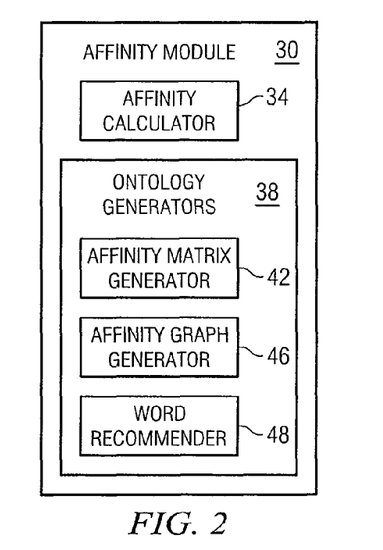
FIG. 2 illustrates one embodiment of an affinity module that may be used with the system of FIG. 1.

FIG. 2 illustrates one embodiment of affinity module 30 that may be used with system 10 of FIG. 1. Affinity module 30 may calculate an affinity for a word pair, record the affinity in an affinity matrix, and/or report the affinity matrix. Affinity module 30 may also generate an affinity graph.

In the illustrated embodiment, affinity module 30 includes an affinity calculator 34, ontology generators 38, and a word recommender 48. Affinity calculator 34 calculates any suitable type of affinity for a word $w_i$ or for a word pair comprising a first word $w_i$ and a second word $w_j$. Examples of affinities include a basic, directional, average, differential, and/or other affinity.

In one embodiment, word recommender 48 receives a seed word and identifies words that have an affinity with the seed word that is greater than a threshold affinity. The threshold affinity may have any suitable value, such as greater than or equal to 0.25, 0.5, 0.75, or 0.95. The threshold affinity may be pre-programmed or user-designated.

A basic affinity may be calculated from the amount (for example, the number) of pages 50 that include words $w_i$ and/or $w_j$. The conjunction page amount represents the amount of pages 50 that include both word $w_i$ and word $w_j$, and the disjunction page amount represents the amount of pages 50 that include either word $w_i$ or word $w_j$. The basic affinity may be given by the conjunction page amount divided by the disjunction page amount. In one example, a number of conjunction pages indicates the number of pages comprising word $w_i$ and word $w_j$, and a number of disjunction pages indicates the number of pages comprising either word $w_i$ or word $w_j$. The basic affinity may be given by the number of conjunction pages divided by the number of disjunction pages:

$$\text{Affinity}(w_i, w_j) = P(W_i \& W_j)/P(W_i + W_j)$$

Figure 3:
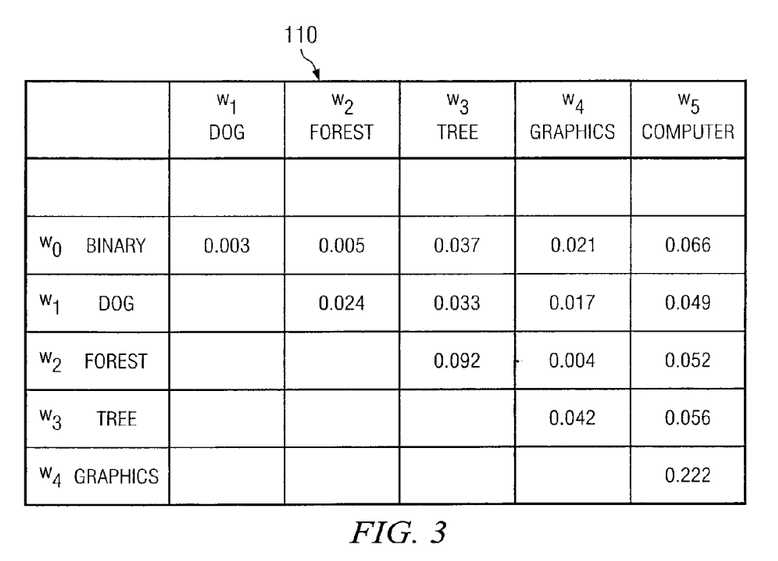
FIG. 3 illustrates an example of an affinity matrix that records basic affinities.

FIG. 3 illustrates an example of an affinity matrix 110 that records basic affinities. In the illustrated example, affinity matrix 110 records the pairwise affinities of words $w_1 \ldots, w_5$. According to affinity matrix 110, the affinity between words $w_0$ and $w_1$ is 0.003, between words $w_0$ and $w_2$ is 0.005, and so on.

Referring back to FIG. 1, an affinity group includes word pairs that have high affinities towards each another, and may be used to capture the relationship between words $w_1$ and $w_2$ with respect to page content. A high affinity may be designated as an affinity over an affinity group threshold. A threshold may be set at any suitable value, such as greater than or equal to 0.50, 0.60, 0.75, 0.90, or 0.95. A word may belong to more than one affinity group. In one embodiment, an affinity group may be represented as a BDD. The pointer for the BDD may be stored with each word of the group in inverted index 62.

A directional affinity may be used to measure the importance of word $w_i$ with respect to word $w_j$. Affinity calculator 34 calculates the directional affinity of word $w_i$ given word $w_j$ from the amount (for example, the number) of pages 50 that include words $w_i$ and $w_j$. A word $w_j$ page amount represents the amount of pages 50 that include word $w_i$. The directional affinity of word $w_i$ given word $w_j$ may be given by the conjunction page amount divided by word $w_j$ page amount. For example, a number of word $w_j$ pages indicates the number of pages 50 that include word $w_i$. The directional affinity of word $w_i$ given word $w_j$ may be given by the number of conjunction pages 50 divided by number of word $w_i$ pages 50:

$$\text{DAffinity}(w_i, w_j) = P(W_i \& W_j)/P(W_i)$$

DAffinity($w_i$, $w_j$) is not the same as DAffinity($w_j$, $w_i$). A high directional affinity DAffinity($w_i$, $w_j$) between words $w_i$ and $w_j$ indicates a higher probability that a page 50 includes word $w_i$ given that the page 50 includes word $w_j$. In one example, pages [1 2 3 4 5 6] include word $w_i$, and pages [4 2] include word $w_j$. The pages that include word $w_j$ also include word $w_i$, so from the viewpoint of word $w_j$, word $w_i$ is of high importance. Only in one-third the pages that include $w_i$ also include word $w_j$, so from the viewpoint of word $w_i$, word $w_j$ is of low importance.

Figure 4:
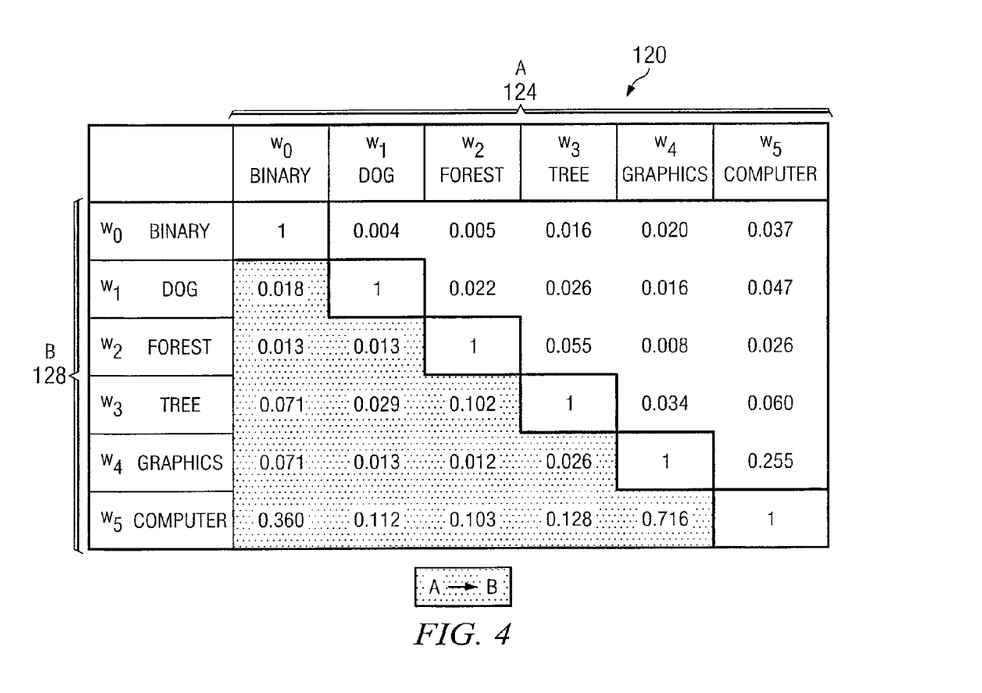
FIG. 4 illustrates an example of an affinity matrix that records directional affinities.

FIG. 4 illustrates an example of an affinity matrix 120 that records the directional affinities for words $w_0, \ldots, W_5$. In the example, words 124 are A words, and words 128 are B words. The rows of matrix 120 record the affinity of a B word given an A word, and the columns of affinity matrix 120 record the affinity of an A word given a B word.

Referring back to FIG. 1, the average affinity of a word $w_i$ calculated with respect to the other words $w_j$. In one embodiment, the average affinity may be the average of the affinities between word $w_i$ and every other word $w_j$. The average affinity of word $w_i$ of N words may be given by:

$$\text{AveAff}(w_i) = \frac{1}{N} \sum_{j=1}^{N} P(w_i \mid w_j)$$

Figure 5:
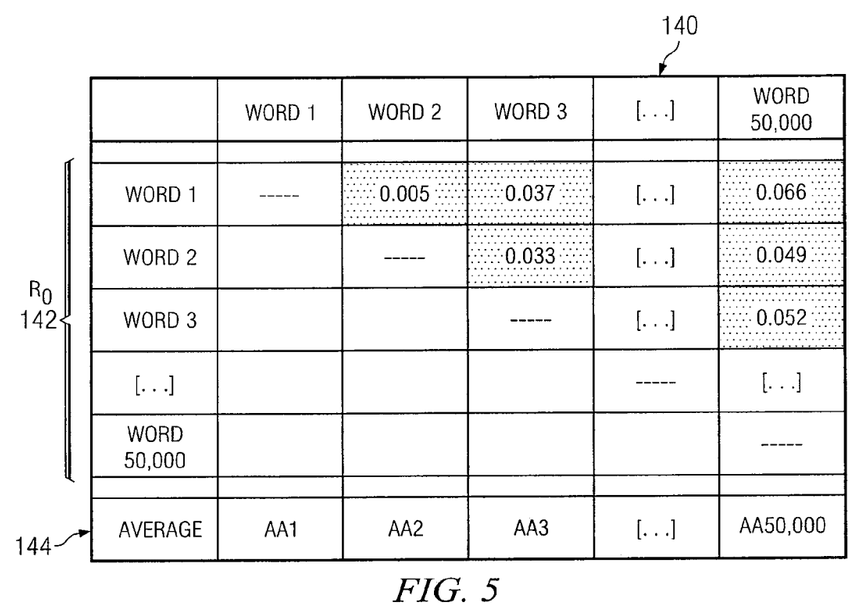
FIG. 5 illustrates an example of an affinity matrix that records average affinities.

FIG. 5 illustrates an example of an affinity matrix 140 that records average affinities. Rows 142 record basic affinities for word 1 through word 50,000. Row 144 records the average affinities of word 1 through word 50,000.

Referring back to FIG. 1, the average affinity of a word may indicate the depth of the word. A word with a lower average affinity may be regarded as a deeper word, and a word with a higher average affinity may be regarded as a shallower word. Deeper words tend to be more technical, specific, and precise. A page 50 with a higher percentage of deeper words may be regarded as a deeper page, and a page 50 with a lower percentage of deeper words may be regarded as a shallower page. In one embodiment, a user may specify the depth of word and/or pages 50 to be retrieved.

The deeper words of a page 50 may form one or more clusters of highly related words. A cluster may represent a common idea, or theme. The number of themes of a page 50 may indicate the specificity of the page 50. A page 50 with fewer themes may be regarded as more specific, and a page 50 with more themes may be regarded as less specific.

The differential affinity for word $w_i$ with respect to word $w_j$ is the directional affinity between words $w_i$ and $w_j$ minus the average affinity of word $w_j$ for all other words. Differential affinity may be expressed as:

$$\text{DiffAff}(w_i, w_j) = \text{DAffinity}(w_i, w_j) - \text{AveAff}(w_j)$$

Differential affinity removes the bias caused by the general tendency for word $w_j$ to occur in pages 50. In particular circumstances, differential affinity may provide a more accurate indication of the probability that a page includes word $w_i$ given that the page includes word $w_j$.

Differential affinities may be used in a variety of applications. In one example, differential affinities among people's names may be used to study social networking. In another example, differential affinities among language elements may be used to study natural language processing. In another example, differential affinities among products may be used to study marketing.

Affinity calculator 34 may use any suitable technique to search inverted index lists to calculate affinities. For example, to identify pages that include both words $w_i$, and $w_j$, affinity calculator 34 may search list $W_i$ of word $w_i$ and list $W_j$ of word $w_j$ for common elements, that is, common page identifiers.

In particular embodiments, an ontology generator 38 generates an ontology 66 of a language, such as an affinity matrix or an affinity graph. An ontology may be generated from any suitable affinity, such as a basic, directional, average, differential, and/or other affinity. Ontologies 66 may be generated from words selected from a language in any suitable manner. For example, words from a commonly used portion of the language or words related to one or more particular subject matter areas may be selected.

In the illustrated embodiment, ontology generators 38 include an affinity matrix generator 42 and an affinity graph generator 46. Affinity matrix generator 42 generates an affinity matrix that records affinities between words. Affinity graph generator 46 generates an affinity graph that represents affinities between words. In an affinity graph, a node represents a word, and the weight of the directed edge between nodes represents the affinity between the words represented by the nodes. An affinity graph may have any suitable number of dimensions.

Figure 6:
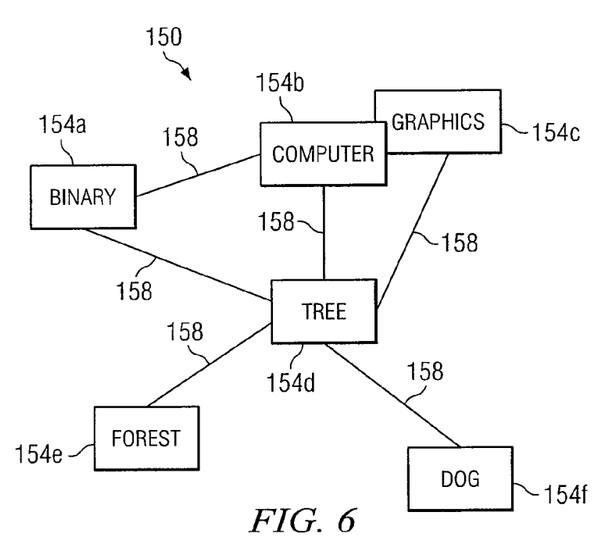
FIG. 6 illustrates an example of an affinity graph.

FIG. 6 illustrates an example of an affinity graph 150. Affinity graph 150 includes nodes 154 and links 158. A node 154 represents a word. In the example, node 154a represents the word "binary." The weight of the directed edge between nodes between nodes 154 represents the affinity between the words represented by nodes 154. For example, a greater weight represents a greater affinity. A link 158 between the nodes indicates that the affinity between the words represented by the nodes 154 is above an affinity threshold. The affinity threshold may have any suitable value, for example, greater than or equal to 0.25, 0.5, 0.75, or 095.

Figure 7:
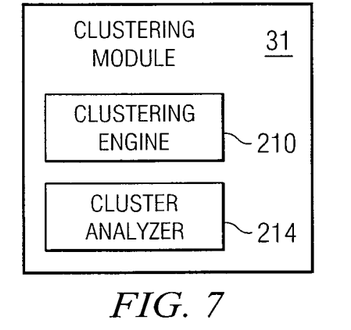
FIG. 7 illustrates one embodiment of a clustering module that may be used with the system of FIG. 1.

FIG. 7 illustrates one embodiment of clustering module 31 that may be used with system 10 of FIG. 1. In particular embodiments, clustering module 31 discovers patterns in data sets by identifying clusters of related elements in the data sets. In particular embodiments, clustering module 31 may identify clusters of a set of words (for example, a language or a set of pages 50). In general, words of a cluster are highly related to each other, but not to words outside of the cluster. A cluster of words may designate a theme (or topic) of the set of words.

In particular embodiments, clustering module 31 identifies clusters of related words according to the affinities among the words. In the embodiments, words of a cluster are highly affine to each other, but not to words outside of the cluster. In one embodiment, words may be regarded as highly affine if they are sufficiently affine. Words may be sufficiently affine if they satisfy one or more affinity criteria (such as thresholds), examples of which are provided below.

Any suitable affinity may be used to identify clusters. In particular embodiments, clustering module 31 uses directional affinity. The directional affinity of a word with respect to other words characterizes the word's co-occurrence. A cluster includes words with similar co-occurrence. In certain embodiments, clustering module 31 uses differential affinity. Differential affinity tends to removes bias caused by the general tendency of a word to occur in pages 50

In the illustrated embodiment, clustering module 31 includes a clustering engine 210 and a clustering analyzer 214. Clustering engine 210 identifies clusters of word according to affinity, and clustering analyzer 214 applies affinity clustering to analyze a variety of situations.

Clustering engine 210 may identify clusters of words according to affinity in any suitable manner. Three examples of methods for identifying clusters are presented: building a cluster from a set of words, sorting words into clusters, and comparing affinity vectors of words. In one embodiment, clustering engine 210 builds a cluster from a set of words. In one example, clustering engine 210 builds a cluster S from a set W of words $\{w_i\}$ with affinities *Aff($w_i$, $w_j$). Affinity value *Aff($w_i$, $w_j$) represents any suitable type of affinity of word $w_i$ with respect to word $w_j$, such as directional affinity DAffinity($w_i$, $w_j$) or differential affinity DiffAff($w_i$, $w_j$). Certain examples of affinity values provided here may be regarded as normalized values. In the example, $\text{Aff}_{for}(w_i, w_j)$ represents forward affinity, and $\text{Aff}_{back}(w_j, w_i)$ represents backward affinity.

In the example, cluster S starts with a seed word $w_q$. The current word $w_x$ represents a word of cluster S that is being compared with a word from set W at the current iteration. Initially, current word $w_x$ is set to seed word $w_q$.

During an iteration, current word $w_x$ is set to a word of cluster S. Words $w_i$ of set W are sorted according to their forward affinity $\text{Aff}_{for}(W_i, w_x)$ with current word $w_x$. Starting at the beginning of the sorted set W, candidate words $w_c$ that meet affinity criteria are identified. The affinity criteria may comprise a forward affinity with the current word $w_x$ criterion:

$$\text{Aff}_{for}(w_c, w_x) > Th_{cf}$$

and a backward affinity with the seed word $w_q$ criterion:

$$\text{Aff}_{back}(w_q, w_c) > Th_{cb}$$

where $Th_{cf}$ represents a forward threshold for a candidate word, and $Th_{cb}$ represents a backward threshold for a candidate word. The first words of an ordered set of candidate words $\{w_c\}$ are added to the cluster S, the number of added words given by the parameter $Size_c$. Thresholds $Th_{cf}$ and $Th_{cb}$ may be floating point parameters with any suitable values ranging from a minimum value to a maximum value. In certain examples, suitable values of $Th_{cf}$ and $Th_{cb}$ may be determined from a rank-ordered list of actual affinities. For example, the $200^{th}$ value in the list may be used. Parameter $Size_c$ may be an integer parameter with any suitable value. Examples of suitable values include a default value of 1, 2, 3, or 4. In particular embodiments, the parameters may be varied at certain iterations.

Any suitable number of iterations may be performed. In one example, the number of iterations may be designated prior to initiation of the method. In another example, the number may be calculated during the performance of the method. For example, the number may be calculated from the growth rate of the size of cluster S.

In another embodiment, clustering engine 210, identifies clusters by sorting words of a set of words into clusters. In one example, the words $\{w_i\}$ of set W are sorted according to affinities *Aff($w_i$, $w_j$), such as differential or directional affinities. In another example, the words $\{w_i\}$ are sorted according to an aggregation function, such as the sum, of affinities of word $w_i$ to each member of a distinct set of words Q. Set W may be selected in any suitable manner. For example, set W may be the X words most relevant to a query, where X may have any suitable value, such as a value in the range from 10 to 100, 100 to 200, or 200 or greater.

In the example, the clusters are initially empty. A first word $w_i$ from set W is placed in a cluster. At each iteration, a current word $w_x$ is selected from set W. Current word $w_x$ is placed into a cluster if *Aff($w_x$, $w_f$) satisfies an affinity criterion given by an affinity threshold Th, where $w_f$ represents the first word placed in the cluster. Threshold Th may have any suitable value, for example, a value in the range of 0.1 to 0.5 for a minimum value of 0.0 and a maximum value of 1.0. If *Aff ($w_x$, $w_f$) does not satisfy threshold Th, current word $w_x$ is placed into an empty cluster. The iterations are repeated for each word of set W.

After processing the words of set W, small clusters may be eliminated. For example, clusters with less than Y words may be eliminated. Y may have any suitable value, such as a value in a range of 3 to 5, 5 to 10, 10 to 25, 25 to 50, or 50 or greater.

If the number of clusters is not within a satisfactory range, the process may be repeated with a different value of threshold Th that yields a stricter or looser criterion for placement in a cluster. The satisfactory range may be given by a cluster number minimum and a cluster number maximum having any suitable values. Examples of suitable values include values in the range of 1 to 5, 5 to 10, or 10 or greater for the minimum, and values in the range of 10 to 15, 15 to 20, or 20 or greater for the maximum. The value of threshold Th may be increased to increase the number of clusters, and may be decreased to decrease the number of clusters.

In another embodiment, clustering engine 210 identifies clusters by comparing affinity vectors of words. In certain embodiments, the rows and columns of affinity matrix can yield affinity vectors<$w_i$, *Aff($w_i$, $w_1$), ..., *Aff($w_i$, $w_j$), ... , *Aff($w_i$, $w_n$)>, which represents the affinity of word $w_i$ with respect to words $w_j$, j=1, ..., n. Affinity value *Aff($w_i$, $w_j$) represents any suitable type of affinity of word $w_i$ with respect to word $w_j$, for example, directional affinity or differential affinity.

In particular embodiments, affinity vectors with similar affinity values may indicate a cluster. For descriptive purposes only, an affinity vector may be regarded as coordinates of the affinity of a word in affinity space. That is, each affinity value *Aff($w_i$, $w_j$) may be regarded as a coordinate for a particular dimension. Affinity vectors with similar affinity values indicate that the words with which the vectors are associated are close to each other in affinity space. That is, the vectors indicate that the words have similar affinity relationships with other words and thus may be suitable for membership in the same cluster.

Affinity vectors may be similar if one affinity vector is proximate to the other affinity vector as determined by a suitable distance function. The distance function may be defined over the affinity vectors as, for example, the standard Euclidian distance for vectors of the given size, or as the cosine of vectors of the given size. The distance function may be designated by clustering engine 210 or by a user.

In particular embodiments, clustering engine 210 applies a clustering algorithm to identify affinity vectors with values that are proximate to each other. Examples of clustering algorithms include direct, repeated bisection, agglomerative, biased agglomerative, and/or other suitable algorithms. In one example, clustering engine 210 may include clustering software, such as CLUTO.

Clustering analyzer 214 may use affinity clustering for analysis in any suitable application. In one embodiment, clustering analyzer 214 may use affinity clustering to categorize pages 50. A category may be associated with a cluster identifier or one or more members of a cluster. In one example, clusters of a page 50 may identified, and then the page 50 may be categorized according to the clusters. In another example, important words of a page 50 may be selected, and then clusters that include the words may be located. The page 50 may then be categorized according to the located clusters.

In one embodiment, clustering analyzer 214 may use affinity clustering to analyze corpuses of pages 50. A corpus may be associated with a particular subject matter, community of one or more individuals, organization, or other entity. In one example, clustering analyzer 214 may identify clusters of a corpus and determine a corpus character of the corpus from the clusters. The corpus character may indicate the words relevant to the entity associated with the corpus. If one or more pages 50 have clusters of the corpus character, the pages 50 may be relevant to the entity.

In one embodiment, clustering analyzer 214 may use affinity clustering for search query disambiguation and expansion. In the embodiment, clustering analyzer 214 identifies clusters that include the search terms of a given search query. The clusters provide alternate words and/or categories relevant to the given search query. In one example, words from a cluster may be reported to a searcher to help with the next search query. In another example, clustering analyzer 214 may select words from the clusters and automatically form one or more new search queries. Clustering analyzer 214 may run the new queries in serial or parallel.

In one embodiment, clustering analyzer 214 may use affinity clustering to study a social network. In one example, pages 50 may provide insight into a social network. Examples of such pages include correspondence (such as letters, emails, and instant messages), memos, articles, and meeting minutes. These pages 50 may include words comprising user identifiers (such as names) of people of a social network. Clusters of names may be identified to analyze relationships among the people of the network. In one example, differential affinity clustering may be used to filter out names that appear most pages 50 without providing information, such as names of system administrators.

In particular embodiments, clustering analyzer 214 may analyze data sets by combining and/or comparing the clusters of the data sets. In one embodiment, clusters of overlapping data sets are compared. Clusters from one data set may be mapped to clusters of the other data set, which may provide insight into the relationships between the data sets. For example, the data sets may be from an analysis of documents of a group of colleagues and from a social networking study of the group. A social network cluster may be mapped to a document subject matter cluster to analyze a relationship between the social network and the subject matter.

Figure 8:
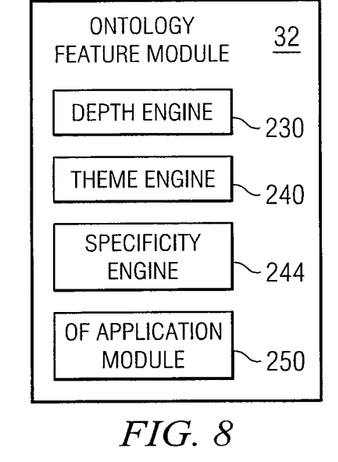
FIG. 8 illustrates one embodiment of an ontology feature module that may be used with the system of FIG. 1.

FIG. 8 illustrates one embodiment of an ontology feature module 32. Ontology feature module 32 may determine one or more ontology features of a set of one or more words (for example, a particular word or document that include words), and may then apply the ontology features in any of a variety of situations. The set of one or more words may include essential terms of a document. A term t may be an essential term if at least one of the top k terms affined to term t is also present in the document. Otherwise, the term may be non-essential to the document.

An ontology feature is a quantifiable measure that characterizes a document along one or more axes of features that may distinguish the document, in a semantic sense, from other documents in a given area. For example, the depth of a document may distinguish the document with respect to its understandability, the specificity of a document may distinguish the document with respect to its focus, and the themes of a document may distinguish the document with respect to its addressed range of topics. An ontology feature can be defined in any suitable manner. For example, independent algorithms in computational linguistics may be used to characterize the readability, or depth, of the document.

In the illustrated embodiment, ontology feature module 32 includes a depth engine 230, a theme engine 240, a specificity engine 244, and an ontology feature (OF) application engine 250. Depth engine 230 may determine the depth of one or more words, for example, a particular word or document that include words. In general, depth may indicate the textual sophistication of words. Deeper words may be more technical and specialized, while shallower words may be more common. In particular embodiments, depth module 32 may calculate the depths of words of a document and then calculate the depth of the document according to the depths of the words. In particular embodiments, depth engine 230 may assign depth values and/or depth rankings to documents and/or words. A deeper document or word may be assigned a higher depth value or ranking, and a shallower document or word may be assigned a lower depth value or ranking.

Depth engine 230 may calculate word depth in any suitable manner. In particular embodiments, depth engine 230 calculates word depth from average affinities. In the embodiments, the depth of a word is a function of the average affinity of the word. A deeper word may have a lower average affinity, while a shallower word may have a higher average affinity. In particular examples, depth engine 230 may calculate the depths of words by ranking the words according to their average affinities. A word with a lower average affinity may be given a higher depth ranking, and a word with a higher average affinity may be given a lower depth ranking.

In particular embodiments, depth engine 230 may calculate word depth using a clustering analysis. In the embodiments, words of a cluster are highly affined to each other, but less so to words outside of the cluster. Distance in cluster space may be measured according to affinity, which may be an indicator of depth. In particular embodiments, words that belong to fewer clusters or to clusters that are smaller and/or farther away from other clusters may be regarded as deeper, and words that belong to more clusters or to clusters that are larger and/or closer to other clusters may be regarded as shallower.

In other particular embodiments, depth engine 230 may calculate word depth by applying a link analysis to an affinity graph 150. The link analysis may be performed by any suitable link analysis algorithm, for example, PAGERANK. For descriptive purposes only, affinity graph 150 of FIG. 6 may be used to calculate word depth. Affinity graph 150 includes nodes 154 and links 158. A node 154 represents a word. A link 158 between nodes 154 indicates that the affinity between the words represented by nodes 154 is above an affinity threshold, that is, the words are satisfactorily affined.

In particular embodiments, depth engine 230 calculates the popularity of nodes 154. A more popular node 154 may represent a shallower word, while a less popular node 154 may represent a deeper word. A link 136 from a first node 154 to a second node 154 is regarded as a popularity vote for the second node 154 by the first node 154. In addition, a vote from a more popular node 154 may have greater weight than a vote from a less popular node 154. Moreover, the affinity of a first node 154 to a second node 154 weights the vote. Depth engine 230 calculates the popularity of nodes 154 from the weighted votes for nodes 154. A less popular word may be regarded as deeper, and a more popular word with may be regarded as shallower.

Depth engine 230 may calculate document depth in any suitable manner. In particular embodiments, depth engine 230 calculates the depth of a document according to the depths of at least one, some, or all words of the document. In certain embodiments, word depth is given by average affinity, so the document depth may be calculated from average affinity of the words of the document. For example, the shallowness of a document may be the average of the average affinity of the words of the document, that is, the sum of the average affinity of each word in document divided by the total number of words in the document. The depth of the document may then be calculated as the inverse of the shallowness of the document.

In particular embodiments, depth may be calculated from the average depth of a selected set of words of the document. The selected set may include the essential words of the document, such as the top (deepest) X % words, where X may be less than 10, 10 to 20, 20 to 30, 30 to 40, 40 to 50, 50 to 60, 60 to 70, or greater than 10. The selected set may exclude P % of the standard grammar words and/or Q % of the stop words, where P and Q have any suitable values, such as less than 10, 10 to 20, 20 to 30, 30 to 40, 40 to 50, 50 to 60, 60 to 70, or greater than 10 In particular embodiments, depth engine 230 calculates the depth of a document according to the distribution of word depth in the document. In particular embodiments, a deeper document may have a higher percentage of deeper words.

In particular embodiments, depth engine 230 calculates the depth of a document according to document affinity. The affinity between documents describe the relationship between the documents. In certain embodiments, the average document affinity may indicate document depth in a manner similar to how the average word affinity may indicate word depth. Document affinity may be defined in any suitable manner. In one example, the number of common words $P(D_1 \& D_2)$ indicates the number of words in both documents $D_1$ and $D_2$, and the number of distinct words $P(D_1+D_2)$ indicates the number of words in either document $D_1$ or $D_2$. Document affinity DocAff between documents $D_1$ and $D_2$ may be defined as:

$$DocAff(D_1,D_2)=P(D_1 \& D_2)/P(D_1+D_2)$$

Depth engine 230 may calculate an average document affinity that in a manner similar to the calculation of average word affinity. A document with a lower average affinity may be regarded as deeper, and a document with a higher average affinity may be regarded as shallower.

In certain embodiments, depth engine 230 may calculate document depth by applying a link analysis to a document affinity graph. A document affinity graph may be similar to affinity graph 150, except that nodes of a document affinity graph represent documents instead of words. Depth engine 230 weights a link from a first node representing a first document to a second node representing a second document with the document affinity of the second document given the first document. The weights of the outgoing links may then be normalized.

In certain embodiments, a depth graph may be displayed on a user interface to show the depths of documents. A depth slider that can be used to select a depth level may also be displayed. In certain embodiments, if a document comprises sections of a larger document, the depth graph can indicate the depths of the sections.

In certain embodiments, depth engine 230 may calculate document depth in any other suitable manner, such as processing histograms of affinities of a document and/or truncating percentages of distinct words based upon depth and then processing the histograms. Other methods include the Gunning-Fog, Flesch, or Fry methods.

In certain embodiments, depth engine 230 may calibrate depth by mapping depth values to particular depth levels. In certain embodiments, depth values in range $R_i$ may be mapped to level $L_i$. For example, $R_0=\{r_0:r_0<c_0\}$ may be mapped to level $L_0$, $R_1=\{r_1:c_0<r_1<c_1\}$ to level $L_1, \ldots$, and $R_n=\{r_n:c_n<r_n\}$ to level $L_n$. The ranges may include any suitable depth values and need not be of the same size. There may be any suitable number of levels, such as less than five, five to seven, seven or eight, eight to ten, ten to 20, 20 to 50, 50 to 100, or greater than 100.

Theme engine 240 may determine the themes (or topics) of a document. In particular embodiments, theme engine 240 determines the themes from the clusters of words in the document, which may be identified by clustering module 31. As discussed above, a cluster of words may designate a theme (or topic) of the set of words. The theme of a document may provide useful information about the content of the document. For example, a document that includes the cluster {renal, kidney, protein, problem} is probably about protein leaking from the kidney due to weakening renal functions, rather than the protein content of kidney beans.

In particular embodiments, theme engine 240 determines themes from a theme map. In the embodiments, keywords are extracted from the document using any suitable technique, for example, a term frequency-inverse document frequency (TF-IDF) technique. The keywords are used to select candidate themes from the theme map. The candidate themes are compared to the document to determine how well the themes match the document. In certain examples, a histogram of the candidate themes may be compared to a histogram of the document. If the candidate themes match the document, the themes can provide an estimate of the types and number of themes of the document.

Specificity engine 240 may calculate the specificity of a document. In particular embodiments, specificity engine 240 may assign specificity values and/or specificity rankings to documents. A more specific document may be assigned a higher specificity value or ranking, and a less specific document may be assigned a lower specificity value or ranking.

In particular embodiments, specificity engine 240 calculates the specificity from the number of themes of the document. In certain examples, a more specific document may have fewer themes, and a less specific document may have more themes. In particular embodiments, specificity engine 240 calculates the specificity from the number of themes of the document and the affinity between the themes. In certain examples, a more specific document may have fewer themes with higher affinity between the themes, and a less specific document may have more themes with lower affinity between the themes.

In particular embodiments, the number of themes may be dependent on depth (or level). For example, a single theme at a shallower depth might represent multiple themes at a greater depth. In certain embodiments, the depth may be selected by a user using a depth slider or may be predetermined. In certain embodiments, the level may be selected by a user or may be predetermined. For example, any suitable number of levels may be defined, and the depth may be calculated with respect to the level. For example, the levels may be domain based (for example, engineering, medical, news, sports, or finance domain); specialty based (for example, cardiology, ophthalmology, or nephrology specialty); topic based (for example, hypertension, cholesterol, bypass surgery, or artery-blocks topic); details based (for example, postural hypotension, chronic hypertension, or acute hypertension detail); resolution based (for example, geriatric etiology, medicinal, or genetic resolution); person based (for example, the user query level).

Ontology feature application engine 250 may apply ontology features (such as depth, themes, or specificity) to perform an ontology feature analysis in any suitable situation. Examples of suitable situations include: searching, sorting, recommending, or selecting documents according to an ontology feature; reporting the ontology features of a document; and determining the ontology features of documents (or sets of documents) of one or more users. In particular embodiments, ontology feature application engine 250 may use indices that include information about an ontology feature. In one example, ontology feature application engine 250 uses a document depth (DD) inverted index 62 that is generated and/or maintained according to depth ranking. DD inverted index 62 includes DD inverted index lists, where a DD inverted index list for a word lists document identifiers of documents (or pages 50) that include the word. The document identifier of a document may indicate the depth of the document. For example, the binary encoding used to encode the document identifiers may indicate the depth. In some cases, the DD inverted index lists may list only documents of a satisfactory depth. In another example, ontology feature application engine 250 uses a ranking table and a depth table in addition to inverted index 62. The depth table may indicate the depths of the documents.

In particular embodiments, ontology feature application engine 250 searches for documents with specified values of an ontology feature, such as specified values of document depth or specificity. The specified values may be predetermined, calculated, or selected by a user. In particular embodiments, the values may be selected using graphical element such as a depth slider and/or a specificity slider.

In particular embodiments, ontology feature application engine 250 may use an ontology feature as a sort criterion to sort documents. For example, ontology feature application engine 250 may sort documents according to document depth and/or specificity with respect to themes as well as other sort criteria. In certain examples, ontology feature application engine 250 searches DD inverted index 62 to obtain documents sorted according to document depth. In some examples, ontology feature application engine 250 searches for documents using a non-DD inverted index 62 and then sorts the documents according to depth.

In particular embodiments, ontology feature application engine 250 may graphically display the values of an ontology feature to a client 20. The graphical displays may be provided for some or all documents, for example, for the documents from the top X % of search results. The ontology feature values may be presented in any suitable manner. In some examples, a graphical indicator, such as a number, word, or icon, may indicate a value. The graphical indicator may be placed next to, for example, an item in a list of search results, a headline of an online newspaper, or a document icon. In some examples, modification of existing iconography may indicate the value. For example the size, font, style, color, of text or a graphical indicator may indicate a value. In another example, a graph may indicate the values. An ontology feature histogram may include a document amount axis and a ontology feature axis, and may indicate the amount of documents of particular ontology feature values. For example, a document depth histogram that includes a document amount axis and a document depth axis may indicate the amount of documents of particular document depths.

In particular embodiments, ontology feature application engine 250 may allow a user to request a search for documents that have particular ontology feature values. The user may be allowed to specify values for different words of a query. In certain examples, ontology feature application engine 250 may provide a user with the option to select a depth, and the user may then input the selected depth. The options may be presented in any suitable manner, such as in: (i) absolute terms (for example, a number or a range of numbers representing depth); (ii) relative terms (for example, a portion of search results with respect to depth, such as "deepest X %"); (iii) semantic terms (for example, 'introductory', 'shallow', 'deep', 'very deep', and/or 'highly technical'); (iv) graphical terms (for example, a slider, a button, and/or other graphical element); or (v) any suitable combination of terms (for example, a slider with semantic labels). In some cases, a slider may include a shallow end and a deep end. A user may move the slider toward one end or the other to indicate a selected depth. When the search results are provided, a document depth histogram may appear by the slider, and may use the slider as the document depth axis.

In particular embodiments, ontology feature application engine 250 may calculate an ontology feature character of a set of one or more users. Ontology feature characters may include user depth and user specificity in the context of a theme. The ontology feature character describes the ontology features of documents associated with the user set. For example, a scientist may use deeper documents than a third grader would use. The ontology feature character may be given with respect to one or more themes. For example, a geneticist may use deeper documents in the field of genetics than he would use in the field of poetry. The ontology feature character may be used to determine the expertise of a user, automatically build a resume for a user, and analyze the social network of a user.

Any suitable documents associated with a user may be analyzed to estimate the ontology feature character, for example, correspondence (such as email and instant messages), web pages, and search history (such as search queries and selected pages). In particular embodiments, ontology feature application engine 250 may track an ontology feature character over time, and may use the past character to predict a future character. In certain examples, ontology feature application engine 250 may assume that a user depth and/or specificity generally increases with time and/or activity in an area.

In particular embodiments, ontology feature application engine 250 may combine certain operations. For example, ontology feature application engine 250 may monitor the depth of a user and then search for documents according to the user depth. In one example, user depth is monitored, and news is provided to the user according to the depth. Future user depth is predicted, and news that fits the predicted user depth is provided.

Figure 9:
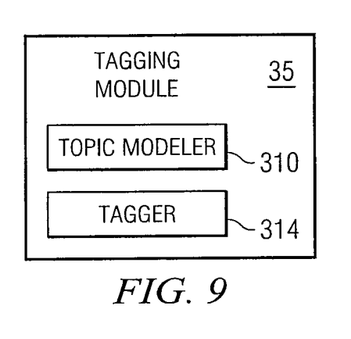
FIG. 9 illustrates one embodiment of a tagging module that may that may be used with the system of FIG. 1.

FIG. 9 illustrates one embodiment of a tagging module 35 that may select tags to tag documents. Tags may be selected in any suitable manner. In particular embodiments, tagging module 35 models a topic (or theme) as the statistical distribution of related words of the topic. Tagging module 35 uses the statistical distributions to identify topics for which high ranking words of a document have the highest probability of appearance and selects tags for the document in accordance with the identified topics. In the illustrated embodiment, tagging module 35 includes a topic modeler 310 and a document tagger 314. In particular embodiments, topic modeler 310 generates statistical distributions that model topics, and document tagger 314 selects tags based on the statistical distributions. Topic modeler 310 and document tagger 314 may any suitable method to model topics and select tags. An example of a method is described with reference to FIG. 10.

In other embodiments, tagging module 35 assigns tags by analyzing paragraphs of the document. In the embodiments, tagging module 35 identifies candidate tags of the paragraphs of a document. Tagging module 35 determines the relatedness of the candidate tags with other candidate tags of the document and selects tags for the document in accordance with the relatedness. An example of a method for assigning tags by analyzing paragraphs of the document is described in more detail with reference to FIG. 11.

In yet other embodiments, tagging module 35 may assign tags based on recommended tags that were selected by a user or by a computer. In the embodiments, tagging module 35 recommends tags for a document. The recommended terms may have a higher affinity with a target tag, but a lower affinity with respect to each other to reduce the ontology space of the document. Tagging module 35 may continue recommending tags in response to the selected tags. Once final tags have been selected, tagging module 35 may assign the selected tags to the document. An example of a method for assigning tags is described in more detail with reference to FIG. 12.

Figure 10:
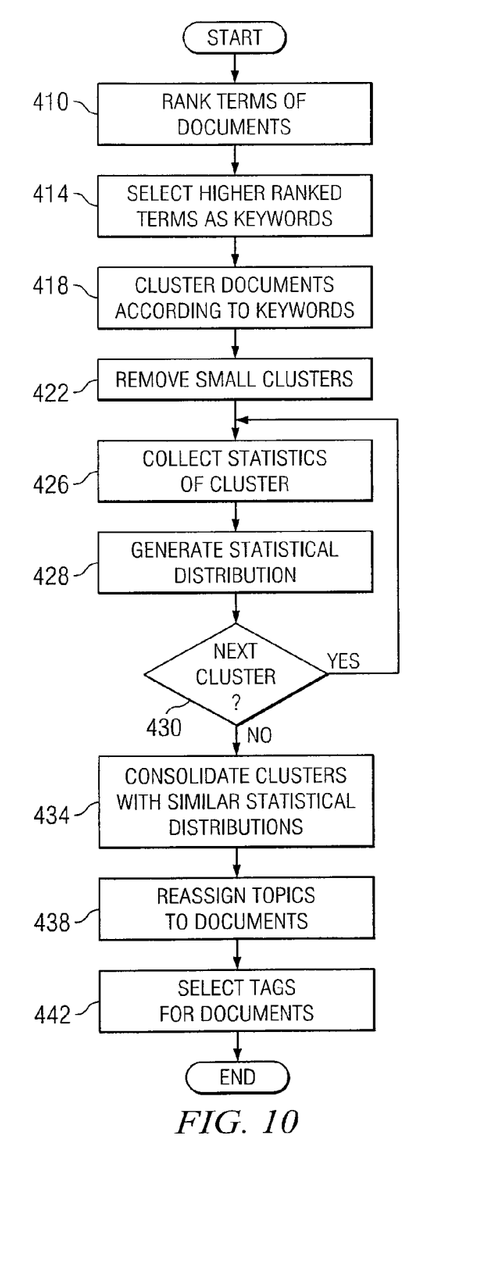
FIG. 10 illustrates an example of a method for determining a statistical distribution for a topic.

FIG. 10 illustrates an example of a method for assigning tags according to the statistical distributions of topics. The statistical distributions may be generated from a universe of words. Any suitable universe may be used, such as the words of a language or a corpus (for example, the Internet). Words appropriate to a topic may have a higher relative probability of appearance than that of other words. For example, for the topic "bicycle," words such as "tire," "chain," and "riding" may have a higher relative probability than that of words such as "brick," "bucket," and "pizza."

The method starts at step 410, where terms of the documents of a corpus are ranked using any suitable ranking technique. In one example of a ranking technique, terms are ranked according to frequency (for example, term frequency or term frequency-inverse document frequency (TF-IDF)). A higher frequency may yield a higher ranking. In another example of a ranking technique, terms are ranked according to the number of standard deviations a term's co-occurrence with other terms is above random chance. A higher number of standard deviations may yield a higher ranking.

One or more highly ranked terms are selected as the keywords of the documents at step 414. In some examples, the top ranked N terms may be used, where N may be one to five, five to ten, or ten or more. In other examples, the terms that are a predetermined distance (such as one standard deviation) above the average ranking for the document may be used.

The documents are clustered according to their keywords at step 418, where the clusters are associated with the keywords. The keyword defined for a cluster is the topic of the cluster. If a document has N keywords, then the document will be represented in N clusters. Small clusters are removed at step 422. A small cluster may be a cluster that fails to satisfy a size threshold, for example, a cluster that represents less than M documents, where M may be a value in the ranges 0 to 50, 50 to 100, or 200 or greater. In some examples, M may be calculated from the size of the corpus. For examples, M may be a value in the ranges 0% to 3%, 3% to 5%, or 5% or greater.

Statistics of a cluster are collected at step 426, and a statistical distribution for the cluster is generated from the statistics at step 428. Any suitable statistics may be collected to generate any suitable statistical distribution (such as a frequency and/or probability distribution). In certain examples, a term frequency indicating the frequency of a word in a cluster is calculated for each word of the cluster. The term frequency may be calculated from the number of appearances of the word in the cluster or from the number of documents in the cluster that include the word. A term distribution is generated from the term frequencies. In other examples, a co-occurrence value indicating the co-occurrence of the topic of the cluster with the topics of another cluster is calculated for each of the other clusters. A co-occurrence distribution is generated from the co-occurrence values. If there is a next cluster at step 430, the method returns to step 426 to collect the statistics of the next cluster. If there is no next cluster at step 430, the method proceeds to step 434.

Clusters with similar statistical distributions are consolidated at step 434. Statistical distributions may be compared, and similar statistical distributions may be consolidated into a single frequency distribution. For example, the clusters for the topics "car" and "automobile" may have similar statistical distributions, so they are consolidated into a single cluster. Statistical distributions may be regarded as similar if the differences between the distributions is less than a difference threshold. The difference threshold may have any suitable value, such as a value in the range of less than or equal to 1%, 5% to 10%, or 10% or greater. The topic of the larger cluster may be selected as the topic for the consolidated cluster.

Topics are reassigned to as tags the documents based on the resulting clusters at step 438. Since some clusters have been consolidated and other clusters have been removed, the topics assigned to the documents may have changed. The reassigned topics may serve as more informative, less duplicative tags for the documents. The method then ends. The method may be performed as the documents of the corpus are updated.

Tags are assigned to documents at step 442. Document tagger 314 may assigns tag to documents in accordance with statistical distributions in any suitable manner. In some examples, document tagger 314 may assign tags to the documents in the corpus in accordance with the reassignment of topics performed at step 438.

In other examples, document tagger 314 may assign tags to documents that are not necessarily in the corpus. The statistical distributions may be used to identify topics for which selected words of the document have a high probability of appearance, and the identified topics may be selected as tags. In the examples, document tagger 314 ranks the words of the document according to any suitable ranking technique, such as discussed above. Starting with the highest ranking word, document tagger 314 determines a frequency of the word for each topic from the statistical distributions of the topics. Document tagger 314 may then rank the topics from the topic for which the word is most frequent to the topic for which the word is least frequent. A statistical distribution of the word with respect to the topics may be generated.

In the examples, document tagger 314 may then generate statistical distributions in a similar manner for one or more other highly ranked words of the document. In certain examples, the statistical distributions of the words may be weighted, for example, equally or according to the ranking of the words. For example, a higher ranking word may have a statistical distribution with a greater weight. The statistical distributions may be consolidated to yield a consolidated statistical distribution. In particular embodiments, the weighted statistical distributions may be summed. For example, values associated with a particular topic are summed to yield a value that indicates the likelihood of the topic given the highly ranked words of the document. Document tagger 314 may assign one or more likely topics as tags for the document.

Figure 11:
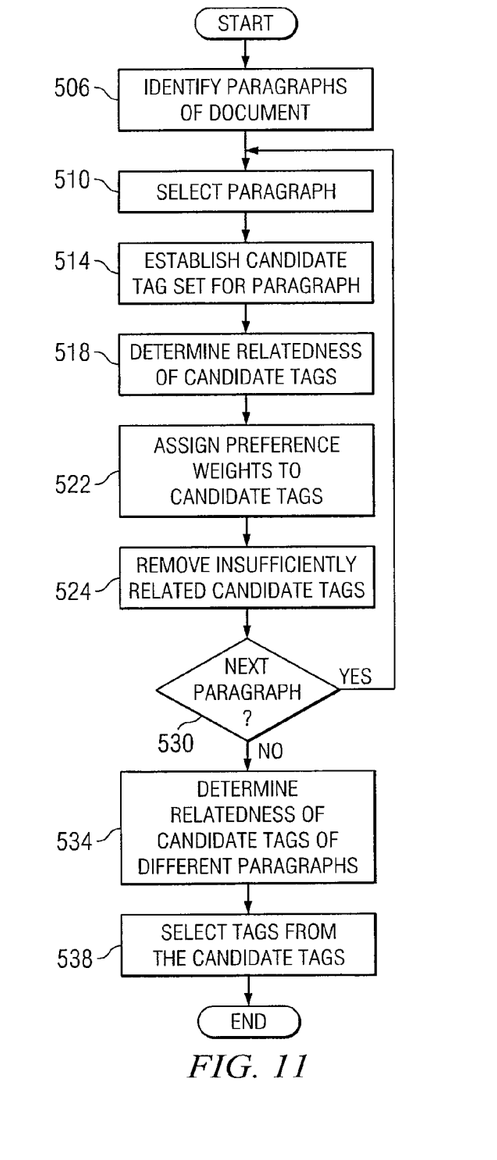
FIG. 11 illustrates an example of a method for assigning tags to a document by analyzing paragraphs of the document.

FIG. 11 illustrates an example of a method for assigning tags to a document by analyzing paragraphs of the document. The method may be used for documents that includes micro-ideas, ideas, and hypotheses. In particular embodiments, a micro-idea comprises an independent, self-contained, unit of expression. One or more related micro-ideas may form an idea. One or more related ideas may form a hypothesis. In certain examples, a sentence expresses a micro-idea, a paragraph expresses an idea, and a series of related paragraphs expresses a hypothesis. In the examples, the paragraphs are related, so the core terms of the paragraphs may have a relatively high directional affinity. Some intersection of the core terms may be used as a tag.

The method starts at step 506, where paragraphs $P_i$ of a document are identified as text units for analysis. A paragraph may refer to any suitable set of characters, words, and/or sentences designated in any suitable manner, for example, by a fixed or variable number of words, by a paragraph mark, or by clustering. A paragraph may be defined to include, for example, a sufficient number of words of sufficient complexity.

A paragraph $P_i$ is selected at step 510. A candidate tag set $S_i = \langle t_1, t_2, \ldots, t_m \rangle$ of tags $t_k$ is established for paragraph $P_i$ at step 514. In particular embodiments, higher ranking words may be selected as candidate tags. (The words may be ranked according to any suitable ranking technique.) In particular embodiments, the initial number of candidate tags may be selected in accordance with the desired resulting number of candidate tags. For example, if the desired resulting number is k, then the initial number may be c*k, where c>1. Parameter c may have any suitable value, for example, c=2, 3, 4, or 5. A highest ranking candidate tag may be selected as the root $r_i$ for set $S_i$.

Relatedness of the candidate tags to each other is determined according to any suitable relatedness technique at step 518. In general, relatedness may be measured in any suitable manner, for example, using any suitable affinity. For example, a tag that is more affine with a target tag may be regarded more related, and a tag that is less affine with a target tag may be regarded less related. In particular embodiments, the tags may be clustered (using, for example, directional and/or differential affinities), and the tags of a cluster may be regarded as related.

Preference weights are assigned to candidate tags at step 520. Preference weights may be assigned according to any suitable ranking technique. For example, a greater preference weight may be given to a candidate tag with a higher frequency in the paragraph and/or a greater inverse of average affinity in the document. Candidate tags that are not sufficiently related to other candidate tags are removed from the candidate tag set at step 524. Any suitable relatedness threshold may designate whether a tag is sufficiently related to other tags. There may be a next paragraph at step 530. If there is a next paragraph, the method returns to step 510 to select the next paragraph. If there is no next paragraph, the method proceeds to step 534.

The relatedness of candidate tag sets of different paragraphs is determined at step 534. Relatedness may be determined according to any suitable relatedness technique. Similar to the case of intra-paragraph analysis, in particular embodiments, the candidate tags may be clustered, and the candidate tags of a cluster may be regarded as sufficiently related In other embodiments, a co-relation profile may be generated for each candidate tag. The co-relation profile indicates the co-relatedness of the candidate tag to other candidate tags, for example, the tags of other candidate tag sets. A greater co-relatedness represents greater relatedness.

A co-relation profile may be computed in any suitable manner. In some examples, a co-relation profile of a candidate tag is generated from the number of candidate tag sets that include the candidate tag, and may take into the account the frequency of the candidate tag in the candidate tag sets. A candidate tag that appears in more candidate tag sets with greater frequency may have greater co-relatedness.

In other examples, the co-relation profile of a candidate tag of set $S_i$ (with root $r_i$) with respect to other sets $S_j$ (with roots $r_j$) may be determined from the directional affinities of the roots $r_i$ and $r_j$. In these examples, the co-relatedness value of a candidate tag of set $S_i$ and a particular set $S_j$ may be calculated by multiplying the preference weight of the candidate tag with the directional affinity of roots $r_i \rightarrow r_j$ over set $S_j$. The co-relatedness of the candidate tag sets $S_j$ may be calculated by combining (for example, summing up) the co-relatedness values of the particular sets.

In yet other examples, the co-relation profile of a candidate tag $t_i$ of set $S_i$ with respect to other sets $S_j$ (with tags $t_j$) may be determined from the directional affinities of the individual tags $t_i$ and $t_j$. In these examples, the co-relatedness value of a candidate tag of set $S_i$ and a particular set $S_j$ is calculated by determining directional affinity of tags $t_i \rightarrow t_j$ over set $S_j$, and summing the directional affinities. The co-relatedness of the candidate tag and sets $S_j$ may be calculated by combining the co-relatedness values of the particular sets.

Tags are selected from the candidate tags at step 538. In particular embodiments, candidate tags that are most highly related to the other candidate tags are selected. In some examples, the highest ranking candidate tags of the clusters may be selected. In other examples, candidate tags with the highest co-relatedness according to the co-relation profiles may be selected. The number k of selected tags may be a predetermined constant or may be a value determined from the depth of the query terms. For example, for queries with deeper terms, a smaller or larger k may be used. The method then ends.

Figure 12:
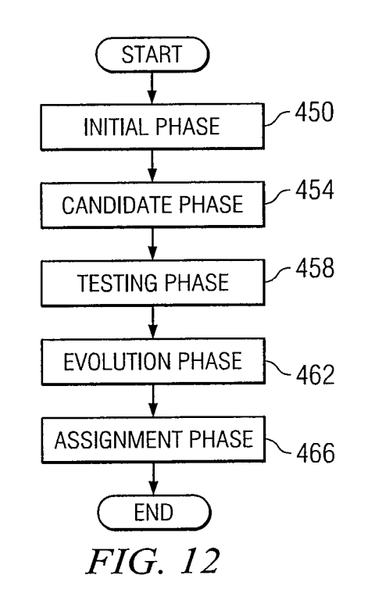
FIG. 12 illustrates an example of a method for assigning tags in response to selected tags.

FIG. 12 illustrates an example of a method for assigning tags in response to selected tags. The method starts in an initial phase at step 450. In the initial phase, document tagger 314 receives an initial tag as a target tag for a document. The initial tag may be from any suitable source. For example, the initial tag may be input by a user or by logic (such as a computer). The logic may input tags resulting from an analysis of the document, other documents associated with a user, or other tags selected for the document. Document tagger 314 may record the source of the tag.

In particular embodiments, document tagger 314 may initiate display of a graphical user interface at client 20 that allows for a user to interact with document tagger 314. In some examples, the interface may allow a user to request addition or deletion of a tag. In other examples, the interface may include a graphical element that allows a user to indicate a desired degree of relatedness that a tag should have to a particular term. For example, the interface may include a slider that may be moved closer to the term to indicate a higher degree or farther away from the term to indicate a lower degree.

In a candidate phase at step 454, document tagger 314 recommends terms in response to the input tag. The recommended terms may be selected to associate a document with a minimal amount of ontology space. For example, the recommended terms may have a higher affinity with the input tag, but a lower affinity with respect to each other. For example, if the input tag is "tree," then the recommended tags may be "plant", "family", or "computer science."

The recommended terms may avoid over specification and under specification. Over specification results from providing essentially ontologically redundant tags that do not provide much additional information. For example, if a document has the tags "tree" and "woods," then adding "forest" does not provide much additional information. Under specification results from providing tags that do not disambiguate a document. For example, the tag "bank" of a document does not specify if the document deals with a financial institution, a river, or the edge of a billiard table.

In a testing phase at step 458, document tagger 314 monitors recommended terms that were selected (for example, by the user) and terms that were not selected, or rejected. For example, document tagger 314 receives "fluid" and recommends "adaptable," "flexible," "liquid," "solution," and "melted." Document tagger 314 notes that "liquid" and "melted" were rejected, so document tagger 314 does not recommend "solution." The selected terms are added to the set of target tags.

In particular embodiments, document tagger 314 may record the source of the tags, for example, a user or logic (such as a computer). The source may have any suitable application. For example, the source may be used to rank search results. In one example, search results that have tags selected by a user may be more highly ranked than results that have tags generated by logic.

In an evolution phase at step 462, document tagger 314 evaluates the differences between recommended terms and selected terms to recommend new terms. Document tagger 314 may recommend terms that have a higher affinity (for example, directional and/or differential affinity) with the selected terms and/or a lower affinity with the rejected terms, and may avoid recommending terms that have a higher affinity with the rejected terms and/or a lower affinity with the selected terms. In particular embodiments, document tagger 314 may remove one or more ontologically redundant tags. Tags may be recommended and selected for any suitable number of iterations, such as one to five, six to 10, or 10 or greater iterations.

In an assignment phase at step 466, document tagger 314 assigns one or more tags to the document. In particular embodiments, document tagger 314 may assign tags in response to the testing phase or to one or more initial tags, independent of the testing phase. The method then ends.

Modifications, additions, or omissions may be made to the methods without departing from the scope of the invention. The methods may include more, fewer, or other steps. Additionally, steps may be performed in any suitable order.

In particular embodiments, the methods may be performed to select search terms instead of tags. The embodiments may be described by replacing "tag" with "search term" in the descriptions included in this document, in particular, the descriptions associated with the methods for assigning tags.

For example, a method may start in an initial phase. In the initial phase, an initial search term is received as a target search term for a search. The initial search term may be from any suitable source, for example, input by a user or by logic (such as a computer). In a candidate phase, terms may be recommended in response to the input search term. The recommended terms may be selected to associate the search with a minimal amount of ontology space. In a testing phase, recommended terms that were selected (for example, by the user) and terms that were not selected, or rejected, may be monitored. In an evolution phase, the differences between recommended terms and selected terms to recommend new terms may be evaluated. Search terms may be recommended and selected for any suitable number of iterations, such as one to five, six to 10, or 10 or greater iterations. Search terms may be selected in response to the selected search terms.

Modifications, additions, or omissions may be made to the methods without departing from the scope of the invention. The methods may include more, fewer, or other steps. Additionally, steps may be performed in any suitable order.

Certain embodiments of the invention may provide one or more technical advantages. A technical advantage of one embodiment may be that tags are assigned in response to selections made by, for example, a user. Tags that may reduce an ontology space of the document are recommended to a user. The user may select from the recommended tags, and more tags may be recommended based on those selections. Tags may be assigned to documents that do not include text, as well as to documents that include text.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed:

1. A computer-implemented method comprising:
   accessing a document stored in one or more tangible media;
   receiving a set of target tags for the document;
   using a microprocessor of a computer, identifying a plurality of terms, each identified term selected to reduce an ontology space of the document due to the identified term having a higher affinity with a target tag and a lower affinity with the other identified terms;
   sending the plurality of identified terms to a user of the computer via a user interface of the computer to recommend the plurality of identified terms as tags;
   receiving, via the user interface of the computer, a selection by the user of one or more terms of the plurality of identified terms and identifying one or more of the plurality of identified terms that were not selected by the user;
   using the microprocessor of the computer, determining a plurality of next terms that have both (i) an affinity with the one or more terms selected by the user that is above a first affinity threshold and (ii) an affinity with the one or more terms that were not selected by the user that is below a second affinity threshold; and
   sending the next terms to the user via the user interface of the computer to recommend the terms as tags.

2. The method of claim 1, the accessing the set of target tags for the document further comprising:
   receiving a target tag of the set of target tags from a source selected from a group consisting of:
      user input; and
      a computer analysis; and
   recording the source of the target tag.

3. The method of claim 1, further comprising:
   establishing a source of each target tag of the set of target tags;
   retrieving a plurality of search results, a search result associated with a target tag; and
   ranking the search results according to the sources of the target tags.

4. The method of claim 1, further comprising:
   removing one or more redundant terms from the set of target tags.

5. The method of claim 1, further comprising:
   initiating display of a graphical element configured to receive a requested degree of relatedness that a tag should have to a particular term.

6. The method of claim 1, further comprising identifying the plurality of terms according to affinity by:
   identifying one or more terms having a higher affinity with a target tag from a cluster corresponding to the target tag.

7. The method of claim 1, further comprising identifying the plurality of terms according to affinity, the affinity further comprising one or more affinities selected from a group consisting of an affinity, an average affinity, a directional affinity, and a differential affinity.

8. One or more non-transitory computer-readable tangible media encoding software operable when executed to:
   access a document stored in one or more tangible media;
   receive a set of target tags for the document;
   identify a plurality of terms, each identified term selected to reduce an ontology space of the document due to the identified term having a higher affinity with a target tag and a lower affinity with the other identified terms;
   send the plurality of identified terms to a computer to recommend the plurality of identified terms as tags;
   receive a selection by a user of one or more terms of the plurality of identified terms and identifying one or more of the plurality of identified terms that were not selected by the user;
   determine a plurality of next terms that have both (i) an affinity with the one or more terms selected by the user that is above a first affinity threshold and (ii) an affinity with the one or more terms that were not selected by the user that is below a second affinity threshold; and
   send the next terms to the computer to recommend the terms as tags.

9. The computer-readable tangible media of claim 8, the software when executed operable to access the set of target tags for the document by:
   receiving a target tag of the set of target tags from a source selected from a group consisting of:
      user input; and
      a computer analysis; and
   recording the source of the target tag.

10. The computer-readable tangible media of claim 8, the software when executed operable to:
    establish a source of each target tag of the set of target tags;
    retrieve a plurality of search results, a search result associated with a target tag; and
    rank the search results according to the sources of the target tags.

11. The computer-readable tangible media of claim 8, the software when executed operable to:
    remove one or more redundant terms from the set of target tags.

12. The computer-readable tangible media of claim 8, the software when executed operable to:
    initiate display of a graphical element configured to receive a requested degree of relatedness that a tag should have to a particular term.

13. The computer-readable tangible media of claim 8, the software when executed operable to identify the plurality of terms according to affinity by:

identifying one or more terms having a higher affinity with a target tag from a cluster corresponding to the target tag.

14. The computer-readable tangible media of claim 8, the software when executed operable to identify the plurality of terms according to affinity, the affinity further comprising one or more affinities selected from a group consisting of an affinity, an average affinity, a directional affinity, and a differential affinity.

15. A computer-implemented method comprising:
receiving a set of target search terms for a search;
using a microprocessor of a computer, selecting a plurality of candidate terms, each candidate term selected to reduce an ontology space of the document due to the candidate term having a higher affinity with a target tag and a lower affinity with the other candidate terms;
sending the candidate terms to a user of the computer via a user interface of the computer to recommend the candidate terms as search terms;
receiving, via the user interface of the computer, a selection by the user of one or more terms of the candidate terms and identifying one or more terms of the candidate terms that were not selected by the user;
using the microprocessor of the computer, determining a plurality of next terms that have both (i) an affinity with the one or more terms selected by the user that is above a first affinity threshold and (ii) an affinity with the one or more terms that were not selected by the user that is below a second affinity threshold; and
sending the next terms to the user via the user interface of the computer to recommend the next terms as search terms.

16. The method of claim 15, the receiving the set of target search terms for the search further comprising:
receiving a target search term of the set of target search terms from a source selected from a group consisting of:
user input; and
a computer analysis; and
recording the source of the target search term.

17. The method of claim 15, further comprising:
establishing a source of each target search term of the set of target search terms;
retrieving a plurality of search results, a search result associated with a target search term; and
ranking the search results according to the sources of the target search terms.

18. The method of claim 15, further comprising:
removing one or more redundant terms from the set of target search terms.

19. The method of claim 15, further comprising:
initiating display of a graphical element configured to receive a requested degree of relatedness that a candidate term should have to a search term.

20. The method of claim 15, further comprising selecting the plurality of candidate terms according to affinity by:
identifying one or more candidate terms having a higher affinity with a target search term from a cluster corresponding to the target search term.

21. The method of claim 15, further comprising selecting the plurality of candidate terms according to affinity, the affinity further comprising one or more affinities selected from a group consisting of an affinity, an average affinity, a directional affinity, and a differential affinity.

22. One or more non-transitory computer-readable tangible media encoding software operable when executed to:
receive a set of target search terms for a search;
select a plurality of candidate terms, each candidate term selected to reduce an ontology space of the document due to the candidate term having a higher affinity with a target tag and a lower affinity with the other candidate terms;
send the candidate terms to a computer to recommend the candidate terms as search terms;
receive a selection by the user of one or more terms of the candidate terms and identifying one or more terms of the candidate terms that were not selected by the user;
determine a plurality of next terms that have both (i) an affinity with the one or more terms selected by the user that is above a first affinity threshold and (ii) an affinity with the one or more terms that were not selected by the user that is below a second affinity threshold; and
send the next terms to the computer to recommend the next terms as search terms.

23. The computer-readable tangible media of claim 22, the software when executed operable to receive the set of target search terms for the search by:
receiving a target search term of the set of target search terms from a source selected from a group consisting of:
user input; and
a computer analysis; and
recording the source of the target search term.

24. The computer-readable tangible media of claim 22, the software when executed operable to:
establish a source of each target search term of the set of target search terms;
retrieve a plurality of search results, a search result associated with a target search term; and
rank the search results according to the sources of the target search terms.

25. The computer-readable tangible media of claim 22, the software when executed operable to:
remove one or more redundant terms from the set of target search terms.

26. The computer-readable tangible media of claim 22, the software when executed operable to:
initiate display of a graphical element configured to receive a requested degree of relatedness that a candidate term should have to a search term.

27. The computer-readable tangible media of claim 22, the software when executed operable to select the plurality of candidate terms according to affinity by:
identifying one or more candidate terms having a higher affinity with a target search term from a cluster corresponding to the target search term.

28. The computer-readable tangible media of claim 22, the software when executed operable to select the plurality of candidate terms according to affinity, the affinity further comprising one or more affinities selected from a group consisting of an affinity, an average affinity, a directional affinity, and a differential affinity.

* * * * *